(No Model.) 2 Sheets—Sheet 2.
E. E. WHIPPLE.
TOOTH SEAT.
No. 445,104. Patented Jan. 20, 1891.
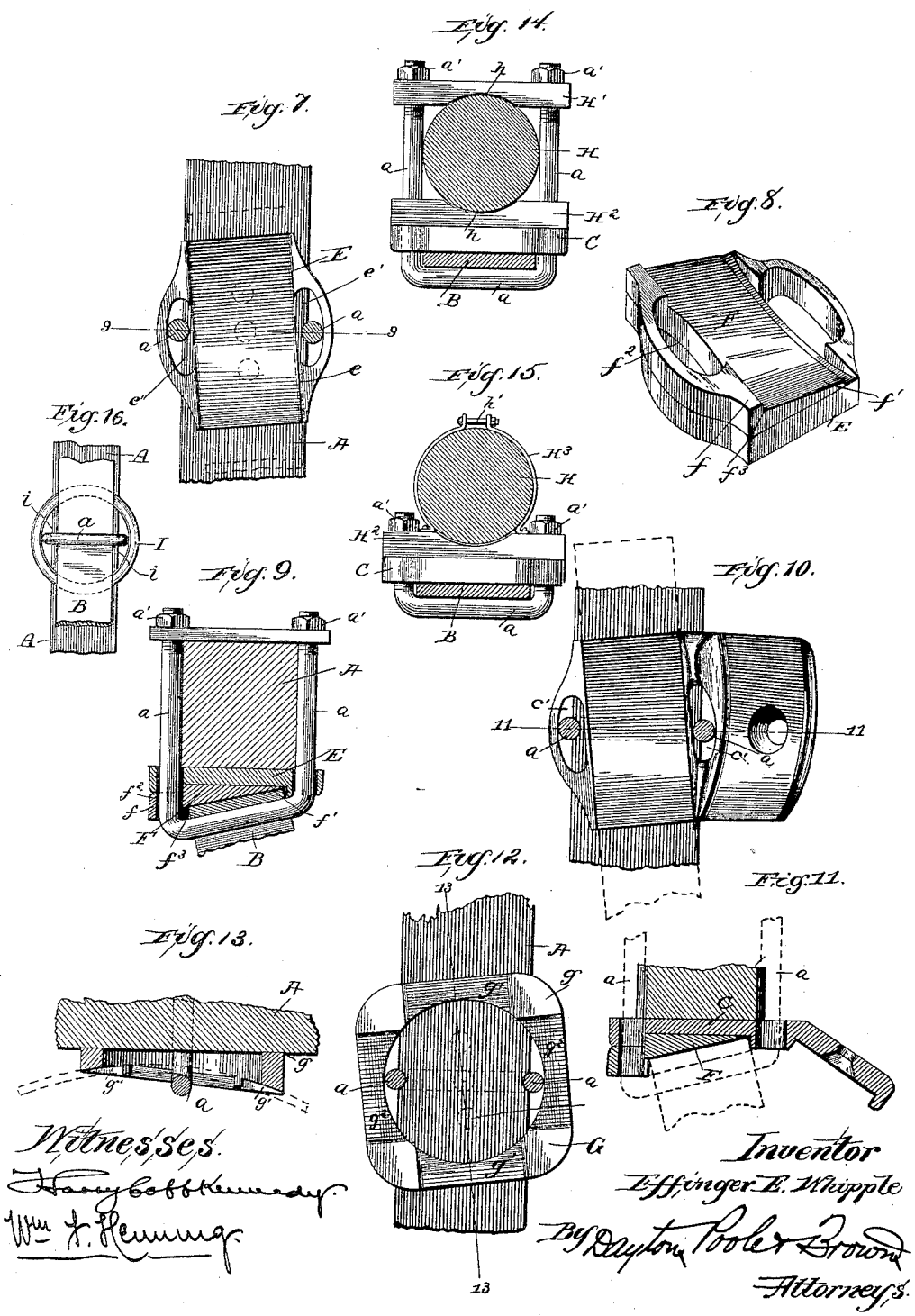

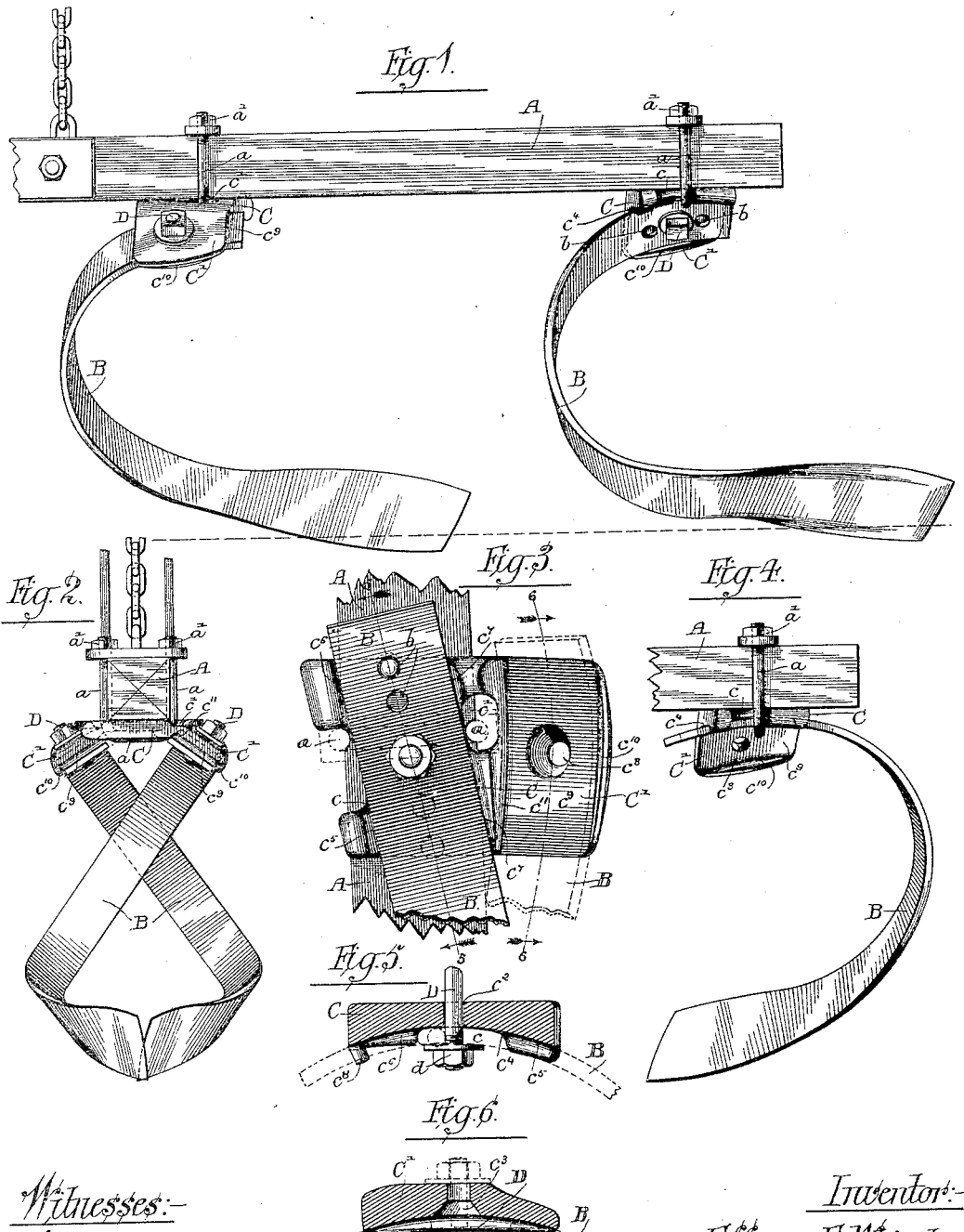

UNITED STATES PATENT OFFICE.

EFFINGER E. WHIPPLE, OF ST. JOHNS, MICHIGAN.

TOOTH-SEAT.

SPECIFICATION forming part of Letters Patent No. 445,104, dated January 20, 1891.

Application filed August 20, 1889. Serial No. 321,412. (No model.)

*To all whom it may concern:*

Be it known that I, EFFINGER E. WHIPPLE, of St. Johns, in the county of Clinton and State of Michigan, have invented certain new and useful Improvements in Devices for Securing Teeth to Harrows or Cultivators; and I do hereby declare that the following is a full, clear, and exact description thereof, reference being had to the accompanying drawings, and to the letters of reference marked thereon, which form a part of this specification.

This invention relates to devices by which harrow and cultivator teeth may be secured to the beams, drag-bars, or other parts of harrows and cultivators in different positions in order to work different kinds of soil.

The invention consists in the features of construction and combinations of parts hereinafter fully described, and pointed out in the appended claims.

In the drawings, Figure 1 is a side view of the drag-bar of a harrow to which my improved plate is applied. Fig. 2 is an end view of the same. Fig. 3 is a bottom view showing the end of the cultivator-tooth secured to the beam and to the plate in a slightly-different manner from that shown in Figs. 1 and 2. Fig. 4 shows still another way of securing the tooth. Fig. 5 is a central vertical sectional view taken upon line 5 5 of Fig. 3. Fig. 6 is a similar view taken upon line 6 6 of Fig. 3. Fig. 7 is a bottom plan view of a modified form of construction. Fig. 8 is a perspective view of the wedge employed in the form shown in Fig. 7. Fig. 9 is a view of the same in cross-section of the parts shown in Fig. 7, taken on the line 9 9 in said figure. Fig. 10 is a bottom plan view of another modification. Fig. 11 is a cross-sectional view of the same on the line 11 11 of said Fig. 10. Fig. 12 is a bottom plan view of another modified form of construction. Fig. 13 is a sectional view of the same on the line 13 13 of Fig. 12. Figs. 14 and 15 illustrate devices for securing the teeth to a circular drag bar or beam. Fig. 16 is a bottom plan view of another modification, showing the employment of an ordinary circular ring.

In the drawings, Figs. 1 to 6, is illustrated a preferred form of construction, in which A indicates a beam, drag-bar or other part of a harrow or cultivator to which the teeth are secured. B B indicate harrow or cultivator teeth secured to the part A by means of the device hereinafter described. In the instance illustrated said teeth are shown as twisted or bent spring harrow-teeth; but it is obvious that any convenient form of teeth could be used in place thereof. C indicates a block or plate secured to the beam A by means of an ordinary U-shaped bolt $a$ and nut $a'$. Upon one edge of the plate C is a recess $c$, and in the center of said plate is an elongated slot or opening $c'$. Through this slot is placed one end of the bolt $a$, the other end being located in the recess $c$ in said plate, as is clearly shown in dotted lines in Fig. 2. The slot $c'$ and the recess $c$ permit of an adjustment of the plate C upon the beam A, as desired. One or more holes or openings $c^2$ may be placed in the plate C, by which the plate and also the tooth B may be secured to the beam A by means of a straight bolt D and nut $d$ in a familiar manner, as shown in Fig. 3. The plate C comprises a main body portion, and an inclined portion C', which is bent at an angle from the main portion of the plate, and which is not designed to come immediately in contact with the beam A, is also provided with a central hole or opening $c^3$, through which a bolt D may be inserted and secured therein for the purpose of fastening the tooth B to this portion of the plate C. The main portion of the plate C is provided with a longitudinal curved recess or groove $c^4$, the same being about the depth of the thickness of a tooth, and provided upon either side, near the marginal portion of the plate C, with projecting shoulders $c^5$ $c^6$ $c^7$, whereby the tooth is more securely held in position on the plate. For greater accuracy, however, a pin $c^8$ is secured to or made integral with the plate C near the back or rear portion thereof. This pin $c^8$ is adapted to enter a suitable hole or opening $b$ in the end of the spring-tooth, thus also holding said tooth from movement. There may be several of said holes $b$ in the end of said spring-tooth B, one of the holes being used for the purpose above mentioned, and through another hole the bolt D may be inserted, if desired. A similar groove or depression $c^9$ is formed in the inclined portion C' of the plate C, forming shoulders $c^{10}$ and $c^{11}$.

In the drawings, the tooth B is shown as bent and twisted in such manner that each side near its cutting point or end may be a cutting-edge. For one kind of work this side or edge will be used and for another kind of work the extreme point will be used. The various adjustments of the tooth by reason of my improved adjusting-block C C' permit of the proper use of the said tooth B when positioned in the various attitudes shown in the drawings.

It is obvious from the foregoing description that when a securing-plate as herein described is employed the tooth is capable of a wide range of adjustment. For instance, a U-shaped bolt is employed to secure the plate to the beam. The said plate can be adjusted relatively to the beam and the tooth can be adjusted upon the plate, so that it is possible to secure the adjustment of said tooth in almost any position. In practice I prefer to use two of my improved plates upon each beam, using a right and left hand plate and securing each tooth in the same relative position to each block. In this manner I may be enabled to make a wider cut than is customary.

It is obvious that various modified forms of construction embodying my invention can be made, and I do not limit my invention to the specific construction shown in Figs. 1 to 6—namely, a plate comprising a flat main body portion and an extended inclined portion made integral therewith, as only one of said portions is used at any time. Consequently in Fig. 7 is shown a plate E, comprising a flat body portion provided with a longitudinal curved recess or groove $e$, within which the end of the tooth is held. The said plate is also provided at its sides with elongated slots or openings $e'$ $e'$, through which passes the U-shaped bolt $a$, that secures the said tooth and plate to the beam, so that said plate is capable of adjustment upon the beam A.

In Figs. 8 and 9 is shown a wedge F for securing the inclined adjustment of the tooth and adapted to be used in connection with the plate shown in Fig. 7, and in place of the extended inclined portion shown in the preceding figures. The said wedge is of considerable thickness at one side, as shown at $f$, and is tapered to form a thin edge at the opposite side, as shown at $f'$. At the side $f$ said wedge is provided with an elongated slot or opening $f^2$. The contour of the rear face of the wedge is similar to that of the under face of the plate E, and is adapted to rest upon and fit the same, the slot $f^2$ registering with one of the slots of the plate. A groove or depression $f^3$ is made in the front inclined face of the wedge F, and said groove is adapted to receive the end of the tooth to be secured. It is obvious that the thickened portion of the wedge can be located on either side of the plate, so as to incline the tooth to the right or left, as desired.

In Figs. 10 and 11 is shown another form of construction, in which the said wedge F is combined with the form of plate shown in Figs. 1 to 6. The main body portion C of the plate is similar in contour to the plate E, and the slots $e'$ in said plate E register with the recess $c$ or slot $c'$ of the plate C when in position thereon, so that the said wedge can be applied to this form of plate without a change in its construction, which affords a greater range of adjustability of the tooth. The U-shaped bolt $a$ and nuts $a'$ are also employed in this form of construction for securing the tooth, wedge, and plate to the beam in a familiar manner.

In Figs. 12 and 13 another form of device is shown, which consists of an annular plate G, provided with a flat upper face $g$, adapted to rest against the beam. The under face of the said annular plate is provided with grooves or depressions $g'$ $g'$ and $g^2$ $g^2$, adapted to receive the tooth. The grooves $g'$ $g'$, are arranged diametrically opposite each other, as are also the grooves $g^2$ $g^2$. The said grooves are also located at an angle to the beam, and the grooves $g'$ are at a different angle from the grooves $g^2$, so as to afford different adjustments of the tooth. The U-shaped bolt $a$ is used to hold the tooth and plate to the beam. The diameter of the opening in the plate G is somewhat greater than the width of the tooth, and in securing the tooth to the beam the plate and tooth are first arranged in position upon the beam, the said tooth resting in one of the sets of grooves therein. The U-shaped bolt $a$ is then inserted, the arms of which pass on either side of the tooth and between it and the sides of the opening and then up on either side of the beam, and are secured by nuts in the usual manner. Thus it will be seen that the said bolt rigidly holds the tooth against the plate, and thereby holds said plate against the beam. It is preferable when using either style of plate not having the inclined face to employ a tooth the upper end of which is bent or twisted considerably more than that illustrated in the drawings.

In Figs. 14 and 15 are shown devices for securing the tooth to a round beam or other part of the harrow or cultivator and which can be used in connection with any desired form of plate. In Fig. 14, H is a circular beam or similar part, and H' H² are two clamping-plates having their inner faces made to fit upon the beam H, as shown at $h$ $h$. The plate C, constructed as described, is arranged upon the lower face of the clamping-plate H², and the bolt $a$ passes around the tooth B, plate C, through the ends of the clamping-plates H' H², and is secured by nuts $a'$ $a'$ in an obvious manner.

In Fig. 15 the upper clamping-plate H' is disposed of and the bolt $a$ is secured to the plate H², said plate H² being secured to the beam H by means of a clip H³, having a set-screw $h'$.

In Fig. 16 I have shown a ring I interposed between beam A and the tooth B. The bolt *a* surrounds the tooth as in the other cases. The inside diameter of the ring I being greater than the width of the tooth B, it is obvious that elongated openings *i i* are formed on either side of the tooth, through which the ends of the bolt *a* may pass, and whereby the adjustment of the ring I and tooth B may be effected.

I claim as my invention—

1. The herein-described device for securing teeth to harrows or cultivators, consisting of a plate, an inclined seat or seats attached thereto, to which the tooth or teeth are secured, means for securing the plate to the harrow, said plate being provided with means for adjusting the position of the plate and tooth with respect to the harrow or cultivator, substantially as described.

2. The herein-described device for securing teeth to harrows or cultivators, comprising a plate having a main body portion, an inclined portion or portions to which the tooth or teeth are secured, a bolt or equivalent means for securing the plate to the harrow, said plate being provided with means for adjusting the position of the plate and tooth with respect to the harrow or cultivator.

3. A device for securing teeth to harrows or cultivators, comprising a plate having a main body portion adapted to be adjustably secured to the harrow or cultivator, and an inclined portion arranged at an angle to the main portion, one or both of said main and inclined portions being provided with grooves or depressions formed in the under face thereof, within which the end of the tooth is secured.

4. A device for securing teeth to harrows or cultivators, comprising a plate having a main body portion provided with slots or openings through which the bolts pass that secure said plate to the harrow, an inclined extended portion arranged at an angle to said main body portion, and means for securing the tooth to said inclined extended portion.

5. A device for securing teeth to harrows or cultivators, comprising a plate having a main body portion provided with slots or openings through which the bolts pass that secure said plate to the harrow, an inclined extended portion arranged at an angle to said main body portion, and means for securing the tooth to said inclined extended portion, substantially as described.

6. The combination, with the beam of a harrow or cultivator and a curved tooth, of an interposed part or member wider than the tooth, and a bolt or clip for securing the latter and said tooth to said beam, the ends of the bolt or clip passing through elongated slots or openings in said interposed member, said interposed member being provided with a depression on its under face adapted to receive the tooth, whereby sidewise movement of the latter is prevented, substantially as specified.

In testimony that I claim the foregoing as my invention I affix my signature in presence of two witnesses.

EFFINGER E. WHIPPLE.

Witnesses:
M. D. HUBBARD,
GEO. A. STEEL.